US012781085B2

(12) United States Patent
Ueda et al.

(10) Patent No.: US 12,781,085 B2
(45) Date of Patent: Nov. 3, 2026

(54) AQUEOUS COATING MATERIAL COMPOSITION AND COATED ARTICLE

(71) Applicant: DAIKIN INDUSTRIES, LTD., Osaka (JP)

(72) Inventors: Yuki Ueda, Osaka (JP); Shingo Okuno, Osaka (JP); Hirokazu Komori, Osaka (JP); Yasukazu Nakatani, Osaka (JP); Akiyoshi Yamauchi, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 643 days.

(21) Appl. No.: 18/309,940

(22) Filed: May 1, 2023

(65) Prior Publication Data

US 2023/0287236 A1 Sep. 14, 2023

Related U.S. Application Data

(63) Continuation of application No. PCT/JP2021/040585, filed on Nov. 4, 2021.

(30) Foreign Application Priority Data

Nov. 6, 2020 (JP) ................................. 2020-185953

(51) Int. Cl.

| | |
|---|---|
| ***C09D 127/12*** | (2006.01) |
| ***B32B 15/08*** | (2006.01) |
| ***C09D 5/00*** | (2006.01) |
| ***C09D 5/16*** | (2006.01) |
| ***C09D 7/20*** | (2018.01) |
| ***C09D 7/61*** | (2018.01) |
| ***C09D 7/65*** | (2018.01) |
| ***C09D 127/14*** | (2006.01) |
| ***C09D 127/18*** | (2006.01) |

(52) U.S. Cl.

CPC ............. *C09D 127/18* (2013.01); *C09D 5/16* (2013.01); *C09D 7/20* (2018.01); *C09D 7/61* (2018.01); *C09D 7/65* (2018.01); *C09D 127/14* (2013.01)

(58) Field of Classification Search

None

See application file for complete search history.

(56) References Cited

U.S. PATENT DOCUMENTS

| | | | | |
|---|---|---|---|---|
| 5,312,576 A | 5/1994 | Swei et al. | | |
| 5,502,097 A | 3/1996 | Saito | | |
| 5,879,746 A | 3/1999 | Tomihashi et al. | | |
| 6,350,806 B1 * | 2/2002 | Tsuda | C09D 127/12 | 524/269 |
| 2004/0242753 A1 | 12/2004 | Tomihashi et al. | | |
| 2011/0144255 A1 * | 6/2011 | Sawauchi | C08J 3/05 | 524/319 |
| 2019/0144700 A1 | 5/2019 | Hosoda et al. | | |

FOREIGN PATENT DOCUMENTS

| | | |
|---|---|---|
| CN | 111040528 A | 4/2020 |
| CN | 111087864 A | 5/2020 |
| JP | 59-147057 A | 8/1984 |
| JP | 5-301974 A | 11/1993 |
| JP | 6-346017 A | 12/1994 |
| JP | 2002-322432 A | 11/2002 |
| JP | 2007-191709 A | 8/2007 |
| JP | 2009-001767 A | 1/2009 |
| WO | 94/05729 A1 | 3/1994 |
| WO | 03/011991 A1 | 2/2003 |
| WO | 2018/016644 A1 | 1/2018 |
| WO | 2020/071382 A1 | 4/2020 |

OTHER PUBLICATIONS

"Laser diffraction for particle sizing", Anton Paar GmbH, 2025, 11 pages.

Gmbh Carl Roth et al., "Section 1: Identification of the substance/mixture and of the company/undertaking", CarlRoth, Mar. 15, 2024 Version 4.1, No. 2631, pp. 1-13 (13 pages).

Extended European Search Report dated Sep. 9, 2024 in Application No. 21889232.1.

International Search Report of PCT/JP2021/040585 dated Feb. 1, 2022 [PCT/ISA210].

International Preliminary Report on Patentability dated May 8, 2023 with a Translation of the Written Opinion of the International Searching Authority in Application No. PCT/JP2021/040585.

* cited by examiner

*Primary Examiner* — Michael J Feely

(74) *Attorney, Agent, or Firm* — Sughrue Mion, PLLC

(57) ABSTRACT

An aqueous coating material composition containing fluororesin particles (A) that can be melt-molded, further containing a binder resin (B), a non-fluorinated surfactant (C) and water (D). The binder resin (B) has a weight loss of 55% or more at 400° C. measured under conditions at 10° C./min under $N_2$, and is contained at a ratio of 10 mass % or less relative to the total solid content of the coating material composition. Also disclosed is a coated article having a coating layer formed by application of the aqueous coating material composition.

17 Claims, No Drawings

AQUEOUS COATING MATERIAL COMPOSITION AND COATED ARTICLE

CROSS REFERENCE TO RELATED APPLICATIONS

This application is a Rule 53(b) Continuation of International Application No. PCT/JP2021/040585 filed Nov. 4, 2021, claiming priority from Japanese Patent Application No. 2020-185953 filed Nov. 6, 2020, the respective disclosures of all of the above of which are incorporated herein by reference in their entirety.

TECHNICAL FIELD

The present invention relates to an aqueous coating material composition and a coated article.

BACKGROUND ART

A fluororesin is known to have various applications and various usage forms such as powder and film based on the excellent heat resistance, weather resistance, oil resistance, solvent resistance, chemical resistance and non-stickiness thereof. In recent years, a fluororesin has attracted attention as a material for a printed circuit board corresponding to a frequency in a high frequency region.

In Patent Literature 1 to 3, an aqueous coating material composition for forming a coating layer made of fluororesin on a metal substrate is disclosed.

In Patent Literature 4, a coating material composition for forming a coating layer made of fluororesin on a metal substrate is disclosed, and the coating material composition blended with a resin component is also disclosed.

In Patent Literature 5, a liquid composition containing a fluorine-containing powder is disclosed.

CITATION LIST

Patent Literature

Patent Literature 1
International Publication No. WO 1994/05729
Patent Literature 2
Japanese Patent Laid-Open No. 2009-1767
Patent Literature 3
Japanese Patent Laid-Open No. 5-301974
Patent Literature 4
International Publication No. WO 2020/071382
Patent Literature 5
International Publication No. WO 2018/016644

SUMMARY

The present disclosure is an aqueous coating material composition containing fluororesin particles (A) that can be melt-molded, further containing a binder resin (B), a non-fluorinated surfactant (C) and water (D), wherein the binder resin (B) has a weight loss of 55% or more at 400° C. measured under conditions at 10° C./min under $N_2$, and is contained at a ratio of 10 mass % or less relative to the total solid content of the coating material composition.

Advantageous Effects of Invention

According to the present disclosure, an aqueous coating material composition is obtained, from which a fluororesin coating layer excellent in electrical properties and surface physical properties can be formed with suppression of powder falling.

DESCRIPTION OF EMBODIMENT

The formation of the fluororesin layer is performed as follows. A fluororesin-containing dispersion is applied to the surface of a substrate, a liquid dispersion medium is evaporated to form a packed layer of powder on the surface of the substrate, and then the powder is melted or sintered. However, a fluororesin is inherently non-sticky, and powder thereof has poor interaction between the particles. Therefore, in formation of the packed layer, powder tends to be missed (powder falling). In order to prevent such powder falling, use of a binder resin has been studied.

The aqueous coating material composition containing fluororesin particles is heated at high temperature to form a coating film. The binder resin is decomposed by the heating. In this case, it is preferable that the decomposition be easily caused by heating to reduce the amount of residue in the coating film. The reason is that the binder resin residue in the coating film causes coloring, which results in deterioration of the resin layer. However, it has been presumed that blending a certain amount or more of a binder resin is required to achieve a sufficient stickiness. Based on the founding that a reduced blending amount of a binder and use of a binder resin which is easily decomposed during heating is preferred, the present disclosure has been completed.

In other words, the present disclosure has been completed based on the founding that an aqueous coating material composition having an excellent effect can be obtained by selecting and using the binder resin (B) having specific physical properties.

Specifically, the binder resin (B) is a binder resin having a moderate water solubility, so that an effect for stably dispersing the fluororesin particles (A) in an aqueous coating material composition and an effect for suppressing powder falling of the fluororesin particles (A) through remaining in a coating layer even after dehydration are achieved. Further, the amount remaining in the coating film after heating is small, so that deterioration and coloring of the resin layer are not caused, which is also preferable.

The binder resin (B) has a weight loss of 55% or more at 400° C. measured under conditions at 10° C./min under $N_2$. The weight loss is preferably 60% or more, more preferably 65% or more.

The present inventors have found that within the range of the weight loss of the binder resin, the effects described above are exhibited. With use of the resin having a large weight change during heating, the cause of deterioration and coloring of the resin layer can be suppressed.

In the present disclosure, the weight loss is a value obtained in TG/DTA measurement under conditions at 10° C./min under $N_2$.

Further, the binder resin (B) has a solubility in water of preferably 2 mass % or more, more preferably 5 mass % or more, and still more preferably 10 mass % or more.

Incidentally, the binder resin (B) may be not completely dissolved in the coating material composition or may be in a dispersion state. In the present disclosure, the dissolubility in water is checked as follows. The binder resin and water are weighed in a container, stirred overnight with a roller rotor, and then left standing for 10 minutes to observe absence of sedimentation of the resin.

The binder resin (B) is not limited as long as the physical properties described above are satisfied, and natural polymers as examples thereof include corn starch and agar. Examples of synthetic polymers include polyvinyl alcohol, methyl cellulose, polyvinylpyrrolidone, hydroxyethyl cellulose, carboxymethyl cellulose, carboxymethyl cellulose sodium salt, polyethylene oxide, polyacrylic acid, sodium polyacrylate, sodium acrylic acid/maleic acid copolymer, sodium acrylic acid/sulfonic acid monomer copolymer, polyacrylamide, and polyethyleneimine. Preferred examples include polyvinyl alcohol, methyl cellulose, polyethylene oxide, and polyvinylpyrrolidone. More preferred examples include polyvinyl alcohol and methyl cellulose.

The polyvinyl alcohol is preferred in terms of easy preparation of a resin suitable for use and purpose because the solubility in water and amount of weight loss can be adjusted through adjustment of the molecular weight and saponification degree. In the case of using polyvinyl alcohol as the binder resin (B), it is preferable that the saponification degree be 30 to 90%. Further, it is preferable that the molecular weight be 1,000 to 1,000,000. Use of ones in such ranges is preferred, because the binder resin (B) satisfying the physical properties described above can be prepared.

The blending ratio of the binder resin (B) relative to the total solid content of the aqueous coating material composition is 10 mass % or less. With a blending ratio of more than 10 mass %, the physical properties such as chemical resistance and heat resistance of the resulting coating layer may be lowered. Further, it is preferable that the content of the binder resin (B) be 0.3 mass % or more. With a content of less than 0.3 mass %, the effect for suppressing powder falling may be insufficient, which is undesirable.

The blending ratio is preferably 10 mass % or less, more preferably 5 mass % or less.

The aqueous coating material composition of the present disclosure with use of the binder resin (B) selected to have the properties described above is able to have an effect for suppressing powder falling even with a reduced blending amount of the binder resin (B). As a result, by reducing the blending amount, various problems caused by blending a large amount of the binder resin (B) can be improved.

The compositional features of the fluororesin particles (A) that can be melt-molded is not limited, and examples thereof include a tetrafluoroethylene [TFE]/hexafluoropropylene [HFP] copolymer [FEP], a TFE/fluoroalkyl vinyl ether copolymer [PFA], a TFE/HFP/fluoroalkyl vinyl ether copolymer [EPA], a TFE/chlorotrifluoroethylene [CTFE] copolymer, a TFE/ethylene copolymer [ETFE], polyvinylidene fluoride [PVdF], and tetrafluoroethylene [LMW-PTFE] having a molecular weight of 300,000 or less. One type of the compounds may be used, or two or more may be mixed.

It is preferable that the fluoroalkyl vinyl ether be at least one selected from the group consisting of, for example, a fluoromonomer represented by a general formula (110):

$CF_2{=}CF{-}ORf^{111}$ wherein $Rf^{111}$ represents a perfluoro organic group;

a fluoromonomer represented by a general formula (120):

$CF_2{=}CF{-}OCH_2{-}Rf^{121}$ wherein $Rf^{121}$ is a perfluoroalkyl group having 1 to 5 carbon atoms;

a fluoromonomer represented by a general formula (130):

$CF_2{=}CFOCF_2ORf^{131}$ wherein $Rf^{131}$ is a linear or branched perfluoroalkyl group having 1 to 6 carbon atoms, a cyclic perfluoroalkyl group having 5 to 6 carbon atoms, or a linear or branched perfluorooxyalkyl group having 2 to 6 carbon atoms containing 1 to 3 oxygen atoms;

a fluoromonomer represented by a general formula (140):

$CF_2{=}CFO(CF_2CF(Y^{141})O)_m(CF_2)_nF$ wherein $Y^{141}$ represents a fluorine atom or a trifluoromethyl group, m is an integer of 1 to 4, and n is an integer of 1 to 4; and a fluoromonomer represented by a general formula (150):

$CF_2{=}CF{-}O{-}(CF_2CFY^{151}{-}O)_n{-}(CFY^{152})_m{-}A^{151}$ wherein $Y^{151}$ represents a fluorine atom, a chlorine atom, a $-SO_2F$ group or a perfluoroalkyl group, the perfluoroalkyl group may contain an ethereal oxygen and a $-SO_2F$ group, n represents an integer of 0 to 3, n $Y^{151}$ may be the same or different, $Y^{152}$ represents a fluorine atom, a chlorine atom or an $-SO_2F$ group, m represents an integer of 1 to 5, m $Y^{152}$ may be the same or different, $A^{151}$ represents $-SO_2X^{151}$, $-COZ^{151}$ or $-POZ^{152}Z^{153}$, $X^{151}$ represents F, Cl, Br, I, $-OR^{151}$ or $-NR^{152}R^{153}$, $Z^{151}$, $Z^{152}$ and $Z^{153}$ are the same or different and represent $-NR^{154}R^{155}$ or $-OR^{156}$, $R^{151}$, $R^{152}$, $R^{153}$, $R^{154}$, $R^{155}$ and $R^{156}$ are the same or different and represent an alkyl group, an aryl group, or a sulfonyl-containing group that may contain H, ammonium, an alkali metal, or a fluorine atom.

In the present specification, the "perfluoro organic group" means an organic group in which all hydrogen atoms bonded to carbon atoms are replaced with fluorine atoms. The perfluoro organic group may have an ether oxygen.

Examples of the fluoromonomer represented by the general formula (110) include a fluoromonomer in which $Rf^{111}$ is a perfluoroalkyl group having 1 to 10 carbon atoms. The perfluoroalkyl group has preferably 1 to 5 carbon atoms.

Examples of the perfluoro organic group in the general formula (110) include a perfluoromethyl group, a perfluoroethyl group, a perfluoropropyl group, a perfluorobutyl group, a perfluoropentyl group, and a perfluorohexyl group.

Further, examples of the fluoromonomer represented by the general formula (110) include the following. In the general formula (110), one in which $Rf^{111}$ is a perfluoro (alkoxyalkyl) group having 4 to 9 carbon atoms, one in which $Rf^{111}$ is a group represented by the following formula:

[Chemical formula 1]

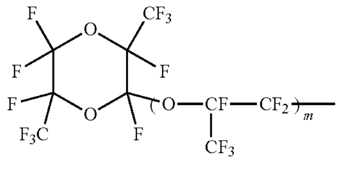

wherein m represents 0 or an integer of 1 to 4, and one in which $Rf^{111}$ is a group represented by the following formula:

[Chemical formula 2]

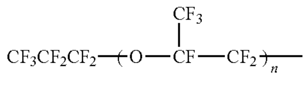

wherein n represents an integer of 1 to 4.

Among the fluoromonomers represented by the general formula (110), a fluoromonomer represented by a general formula (160):

$CF_2{=}CF{-}ORf^{161}$ wherein $Rf^{161}$ represents a perfluoroalkyl group having 1 to 10 carbon atoms, is preferred. It is preferable that $Rf^{161}$ be a perfluoroalkyl group having 1 to 5 carbon atoms.

It is preferable that the fluoroalkyl vinyl ether be at least one selected from the group consisting of fluoromonomers represented by the general formulas (160), (130) and (140).

The fluoromonomer represented by the general formula (160) is preferably at least one selected from the group consisting of perfluoro(methyl vinyl ether), perfluoro(ethyl vinyl ether), and perfluoro(propyl vinyl ether), and more preferably at least one selected from the group consisting of perfluoro(methyl vinyl ether) and perfluoro(propyl vinyl ether).

It is preferable that the fluoromonomer represented by the general formula (130) be at least one selected from the group consisting of $CF_2{=}CFOCF_2OCF_3$, $CF_2{=}CFOCF_2OCF_2CF_3$, and $CF_2{=}CFOCF_2OCF_2CF_2OCF_3$.

It is preferable that the fluoromonomer represented by the general formula (140) be at least one selected from the group consisting of $CF_2{=}CFOCF_2CF(CF_3)O(CF_2)_3F$, $CF_2{=}CFO(CF_2CF(CF_3)O)_2(CF_2)_3F$, and $CF_2{=}CFO(CF_2CF(CF_3)O)_2(CF_2)_2F$.

It is preferable that the fluoromonomer represented by the general formula (150) be at least one selected from the group consisting of $CF_2{=}CFOCF_2CF_2SO_2F$, $CF_2{=}CFOCF_2CF(CF_3)OCF_2CF_2SO_2F$, $CF_2{=}CFOCF_2CF(CF_2CF_2SO_2F)OCF_2CF_2SO_2F$, and $CF_2{=}CFOCF_2CF(SO_2F)_2$.

In the present specification, the "organic group" means a group having one or more carbon atoms or a group formed by removing one hydrogen atom from an organic compound.

Examples of the "organic group" include:

an alkyl group which may have one or more substituents,
an alkenyl group which may have one or more substituents,
an alkynyl group which may have one or more substituents,
a cycloalkyl group which may have one or more substituents,
a cycloalkenyl group which may have one or more substituents,
a cycloalkadienyl group which may have one or more substituents,
an aryl group which may have one or more substituents,
an aralkyl group which may have one or more substituents,
a non-aromatic heterocyclic group which may have one or more substituents,
a heteroaryl group which may have one or more substituents,
a cyano group, a formyl group, RaO—, RaCO—, $RaSO_2$—, RaCOO—, RaNRaCO—, RaCONRa—, RaOCO—, $RaOSO_2$—, and $RaNRbSO_2$—,
wherein Ra is independently
an alkyl group which may have one or more substituents,
an alkenyl group which may have one or more substituents,
an alkynyl group which may have one or more substituents,
a cycloalkyl group which may have one or more substituents,
a cycloalkenyl group which may have one or more substituents,
a cycloalkadienyl group which may have one or more substituents,
an aryl group which may have one or more substituents,
an aralkyl group which may have one or more substituents,
a non-aromatic heterocyclic group which may have one or more substituents, or
a heteroaryl groups which may have one or more substituents, and
Rb is independently an alkyl group which may have H or one or more substituents.

It is preferable that the organic group be an alkyl group which may have one or more substituents.

As the fluororesin particles (A), FEP, PFA or EPA is preferred in terms of non-stickiness and surface smoothness, and PFA, which has a melting point of 300° C. or more, is particularly preferred due to no occurrence of deformation during soldering.

The fluororesin particles (A) have an average particle size of preferably 0.05 to 1,000 μm, more preferably 0.1 to 100 μm, and still more preferably 0.1 to 30 μm. An average particle size within the range is preferred, because a thin film and a smooth resin coating layer can be obtained.

The average particle size is a volume average particle size measured by, for example, a laser diffraction/scattering method. In order to make the fluororesin particles (A) have a desired particle size, classification may be performed by sieving or wind power.

The fluororesin particles (A) have a particle size at a cumulative volume of 50% of 0.05 to 40 μm, and more preferably 7 to 40 μm. The particle size at a cumulative volume of 50% is a particle size determined as follows. The particle size distribution is measured by the laser diffraction/scattering method to obtain a cumulative curve relative to the total volume of particle population as 100%. The particle size at a cumulative volume of 50% corresponds to a point where the cumulative volume reaches 50% on the cumulative curve. A particle size at a cumulative volume of 50% within the range is preferred, because a smooth coating resin layer made of thin film can be formed.

The method for producing the fluororesin particles (A) described above is not limited, and specifically, the fluororesin particles (A) can be produced by, for example, the method described in Japanese Patent Laid-Open No. 2009-1767.

The polymerization method of the fluororesin constituting the fluororesin particles (A) is not limited, and examples thereof include bulk polymerization, suspension polymerization, solution polymerization, and emulsion polymerization. In the polymerization, each of the conditions such as temperature and pressure, the polymerization initiator and other additives may be appropriately set according to the desired compositional features and amount of the fluororesin.

The blending amount of the fluororesin particles (A) in the aqueous coating material composition relative to the total mass of the composition is 10 to 80 mass %, preferably 15 to 75 mass %, and more preferably 20 to 50 mass %. With a blending amount of the fluororesin particles (A) of less than the lower limit, the viscosity is too low, so that application to an article surface immediately causes dripping and thick coating cannot be achieved. On the other hand, with a too large blending amount of the fluororesin particles (A), the coating material has no flowability, so that coating cannot be achieved. The specific blending amount may be appropriately selected within the range in consideration of the coating method, adjustment of the film thickness, etc., and it is preferable that in the case of spray coating, etc., the concentration be set to a relatively low level, while in the case of coating with pressure, etc., the concentration be set to 50 mass % or more to make a paste form.

In the present disclosure, the solid content concentration of the aqueous coating material composition is measured by a heating residue mass measuring method.

The aqueous coating material composition of the present disclosure further contains a non-fluorinated surfactant (C). Considering the cost, to contain a non-fluorinated surfactant instead of a fluorinated surfactant is one of the reasons why the aqueous coating material composition of the present disclosure is preferred.

The non-fluorinated surfactant (C) is not limited as long as the fluororesin particles (A) can be stably dispersed in the composition, and any one of anionic surfactants, cationic surfactants, nonionic surfactants and amphoteric surfactants may be used. Examples thereof include anionic surfactants such as sodium alkyl sulphate, sodium alkyl ether sulphate, triethanolamine alkyl sulphate, triethanolamine alkyl ether sulphate, ammonium alkyl sulphate, ammonium alkyl ether sulphate, alkyl ether sodium phosphate, and sodium fluoroalkyl carboxylate; cationic surfactants such as alkylammonium salts and alkylbenzylammonium salts; nonionic surfactants such as polyoxyethylene alkyl ethers, polyoxyethylene phenyl ethers, polyoxyethylene alkyl esters, propylene glycol-propylene oxide copolymers, perfluoroalkylethylene oxide adducts, 2-ethylhexanol ethylene oxide adducts; and amphoteric surfactants such as alkylamino acetate betaine, alkylamide acetate betaine, and imidazolium betaine. Among these, anionic and nonionic surfactants are preferred. Particularly preferable surfactants are nonionic surfactants with an oxyethylene chain having less amount of pyrolysis residual quantity.

As the non-fluorinated surfactant (C), acetylene surfactants such as hydrocarbon surfactants, silicone surfactants, and acetylene glycol may be also used. Further, among these non-fluorinated surfactants, one or a combination of two or more may be used. Incidentally, it is preferable not to use nonylphenol surfactants.

As the non-fluorinated surfactant (C), silicone surfactants are particularly preferred. The silicone surfactants are not limited, and examples thereof include an organopolysiloxane modified with a hydrophilic group such as polyoxyethylene (POE)-modified organopolysiloxane, polyoxyethylene/polyoxypropylene (POE/POP)-modified organopolysiloxane, POE sorbitan-modified organopolysiloxane, and POE glyceryl-modified organopolysiloxane.

Specific examples thereof include DBE-712 and DBE-821 (manufactured by Azmax Corp.), KP series, KF-6015, KF-6016, KF-6017 and KF-6028 (manufactured by Shin-Etsu Chemical Co., Ltd.), ABIL-EM97 (manufactured by Goldschmidt-Thermit Japan Co., Ltd.), Polyflow KL-100, Polyflow KL-401, Polyflow KL-402, and Polyflow KL-700 (manufactured by Kyoeisha Chemical Co., Ltd.), “FZ-77” (manufactured by Toray Dow Corning Co., Ltd.), and “BYK-333” (manufactured by Big Chemie Japan KK).

The blending amount of the non-fluorinated surfactant (C) relative to 100 mass % of the fluororesin particles (A) is preferably 0.01 to 50 mass %, preferably 0.1 to 30 mass %, and more preferably 0.2 to 20 mass %. With a too small amount of the surfactant added, the fluororesin particles may not be uniformly dispersed and may partially float. On the other hand, with a too large amount of the surfactant added, the decomposition residue of the surfactant resulting from sintering increases to cause coloring, and the heat resistance and non-stickiness of the coating film deteriorate.

The aqueous coating material composition of the present disclosure contains water (D) as solvent. The medium of water is preferred in terms of little adverse effect on the environment.

Further, it is preferable that the aqueous coating material composition of the present disclosure contains a water-soluble solvent in combination with water. The water-soluble solvent has a function of wetting the fluororesin particles (A), and the solvent having a high boiling point acts as a drying retarder that connects the resins to each other during drying after coating to prevent the occurrence of cracks. Even a high boiling point solvent evaporates at the sintering temperature of the fluororesin, having no negative effect on the coating film.

Specific examples of the water-soluble solvent include a low boiling point organic solvent having a boiling point of up to 100° C. such as methanol, ethanol, isopropanol, sec-butanol, t-butanol, acetone, and methyl ethyl ketone; a medium boiling point organic solvent having a boiling point of 100 to 150° C. such as methyl cellosolve and ethyl cellosolve; a high boiling point organic solvent having a boiling point of 150° C. or more such as N-methyl-2-pyrrolidone, N,N-dimethylacetamide, 3-butoxy-N,N-dimethylpropanamide, 3-butoxy-N,N-dimethylpropanamide, N,N-dimethylformamide, ethylene glycol, propylene glycol, glycerol, dimethyl carbitol, butyl dicarbitol, butylcellosolve, 1,4-butanediol, diethylene glycol, triethylene glycol, and tetraethylene glycol. One of the water-soluble solvents or a mixture of two or more may be used. As the water-soluble solvent, a high boiling point organic solvent is preferred, and in particular, the glycol solvent is more preferred in terms of dispersion stability and safety.

The blending amount of the water-soluble solvent is preferably 0.5 to 50 mass %, more preferably 1 to 30 mass %, relative to the total amount of water. In the case of a low boiling point organic solvent, with a too small blending amount, bubbles are likely to be embraced, while with a too large blending amount, the entire composition becomes flammable and the advantage of the aqueous dispersion composition is impaired. In the case of a medium boiling organic solvent, with a too large blending amount, the solvent may remain in the coating film even after sintering to have a negative effect, while with a too small blending amount, the fluororesin returns to powder during drying after coating and cannot be sintered. In the case of a high boiling point organic solvent, with a too large blending amount, the solvent may remain in the coating film even after sintering to have a negative effect. It is preferable that none of the water-soluble solvent remain in the coating film after sintering of the fluororesin particles (A) through selection of the solvent having volatile property or adjustment of the blending amount. Absence of the glycol solvent remaining after sintering of the fluororesin particles (A) can be confirmed by no weight loss of the coating film scraped off after sintering near the boiling point of the glycol solvent in the TG/DTA measurement.

It is preferable that the aqueous coating material composition of the present disclosure further contains an inorganic filler (F) in order to improve the electrical properties, strength, heat resistance, etc. The inorganic filler (F) is not limited, and examples thereof include inorganic compounds such as silica (more specifically, crystalline silica, fused silica, and spherical fused silica), titanium oxide, zirconium oxide, zinc oxide, tin oxide, silicon nitride, silicon carbide, boron nitride, calcium carbonate, calcium silicate, potassium titanate, aluminum nitride, indium oxide, alumina, antimony oxide, cerium oxide, magnesium oxide, iron oxide, and tin-doped indium oxide (ITO). Further, examples thereof include mineral substances such as montmorillonite, talc, mica, boehmite, kaolin, smectite, xonotlite, vermiculite, and sericite. Examples of other fillers include carbon compounds such as carbon black, acetylene black, ketjen black, and carbon nanotube; metal hydroxides such as aluminum hydroxide and magnesium hydroxide; and various types of glass such as glass bead, glass flake and glass balloon.

As the inorganic filler (F), one or two or more types of inorganic filler may be used.

As the inorganic filler (F), powder may be used as it is, or may be dispersed in a resin for use.

As the inorganic filler (F), silica, alumina and titanium oxide are preferred, and silica is particularly preferred due to having a low specific gravity and a low dielectric constant. By containing silica, the thermal expansion coefficient of the coating film can be controlled to a low level. Due to this effect, the warpage of a circuit board can be suppressed, which is preferable. Further, the peeling strength of the coating layer is also enhanced.

The shape of the inorganic filler is not limited, and, for example, a granular shape, a spherical shape, a flaky shape, a needle shape, a columnar shape, a spindle shape, a frustum shape, a polyhedral shape, or a hollow shape may be employed. In particular, a spherical shape, a cubic shape, a bowl shape, a disc shape, an octahedral shape, a flaky shape, a stick shape, a plate shape, a rod shape, a tetrapod shape or a hollow shape is preferred, and a spherical shape, a cubic shape, an octahedral shape, a plate shape, or a hollow shape is more preferred. With a flaky shape or a needle shape, the filler having anisotropic properties is arranged, so that higher adhesion can be achieved. The filler in a spherical shape has a small surface area, so that the impact on the properties of the fluororesin can be reduced. Further, when blended in a liquid substance, the filler in a spherical shape is preferred in terms of the small degree of thickening.

It is preferable that the inorganic filler (F) has an average particle size of 0.1 to 20 μm. With an average particle size in the range, favorable surface roughness can be obtained due to less aggregation. The lower limit of the average particle size is preferably 0.1 μm, more preferably 0.3 μm. The upper limit of the average particle size is preferably 5 μm, more preferably 2 μm. The average particle size is a value measured by a laser diffraction/scattering method.

It is preferable that the inorganic filler (F) has a maximum particle size of 10 μm or less. With a maximum particle size of 10 μm or less, the dispersion state is favorable due to less aggregation. Further, the surface roughness of the resulting coating film can be reduced. The maximum particle size is more preferably 5 μm or less. The maximum particle size was determined from the image data of 200 randomly selected particles, based on an SEM (scanning electron microscope) photograph with use of an image analysis software for SEM.

The inorganic filler (F) may be surface-treated, for example, with a silicone compound. By surface-treating with the silicone compound, the dielectric constant of the inorganic filler (F) can be reduced.

The silicone compound is not limited, and a conventionally known silicone compound may be used. For example, it is preferable that the silicone compound comprises at least one selected from the group consisting of silane coupling agents and organosilazanes.

Regarding the surface treatment amount of the silicone compound, the reaction amount of a surface-treating agent on the surface of the inorganic filler is preferably 0.1 to 10 pieces, more preferably 0.3 to 7 pieces, per unit surface area ($nm^2$).

It is preferable that the inorganic filler (F) has a water dispersibility of 30 mass % or more. With a water dispersibility of less than 30 mass %, the stability of the aqueous coating material composition may be lowered due to insufficient dispersibility.

Regarding the water dispersibility, after the inorganic filler and water are weighed in a container and dispersed with sufficient shearing force, it is checked that the inorganic filler surface gets wet and no sedimentation occurs for several minutes when stirring is stopped.

The specific surface area of the inorganic filler (F) measured by the BET method is, for example, preferably 1.0 to 25.0 $m^2/g$, more preferably 1.0 to 10.0 $m^2/g$, and still more preferably 2.0 to 6.4 $m^2/g$. With a specific surface area in the range, the coating film surface is smooth due to less aggregation of the inorganic filler in a film, which is preferable.

The blending amount of the inorganic filler (F) relative to 100 mass % of the total amount with the fluororesin particle (A) is preferably 10 to 90 mass %, more preferably 30 to 70 mass %, and still more preferably 40 to 60 mass %.

In the aqueous coating material composition, various additives usually added to a fluororesin composition, for example, coloring pigments, stabilizers, thickeners, decomposition accelerators, rust inhibitors, preservatives, and antifoaming agents may be blended in addition to each of the components described above.

The aqueous coating material composition may be a clear coating material containing no coloring pigment, or may be a coloring coating material containing a coloring pigment on an as needed basis.

The present disclosure also relates to a coated article characterized by having a coating layer formed by coating the aqueous coating material composition.

The aqueous coating material composition may be applied by a coating method used for ordinary coating material, and examples of the coating method include spray coating, roll coating, coating with a doctor blade, dip (immersion) coating, impregnation coating, spin flow coating, curtain flow coating, coating with a bar coater, gravure coating, and micro gravure coating.

After the coating, the coated article of the present disclosure can be obtained through drying and sintering. The drying is not limited as long as the aqueous medium can be removed, and examples thereof include a method of heating at room temperature to 130° C. for 5 to 30 minutes on an as needed basis. The sintering is performed at a temperature equal to or more than the melting temperature of the fluororesin particles, and is usually performed preferably in the range of 200 to 400° C. for 10 to 60 minutes. In order to prevent oxidation of the coated metal foil, it is preferable that drying and sintering be performed under an inert gas.

Examples of the usable article substrate of the coated article of the present disclosure include metals such as iron, stainless steel, copper, aluminum and brass; glass products such as glass sheets, woven fabrics of glass fiber and nonwoven fabrics of glass fiber; articles molded of or covered with a general-purpose or heat-resistant resin such as polypropylene, polyoxymethylene, polyimide, modified polyimide, polyamideimide, polysulfone, polyether sulfone, polyether ether ketone, and liquid crystal polymer; articles molded of or covered with a general-purpose elastomer such as SBR, butyl elastomer, NBR, and EPDM, or heat-resistant elastomer such as silicone elastomer and fluoroelastomer;

woven fabrics and non-woven fabrics of natural fiber or synthetic fiber; or laminated substrates formed of combination thereof.

The article substrate may be surface-treated. Examples of the surface treatment include surface roughening to a desired roughness by sandblasting, surface roughening by adhering particles, and processing to prevent metal oxidation.

The coated article of the present disclosure is usable in a field requiring heat resistance, solvent resistance, lubricity, or non-stickiness, and may be used for films, fiber-reinforced films, prepregs, metal foils with resin, metal-clad laminates, printed circuit boards, dielectric materials for wiring boards, laminated circuit boards, etc.

It is particularly preferred that the coated article of the present disclosure has a coating layer formed of the aqueous coating material composition of the present disclosure on a copper foil. In recent years, communication in high frequency regions has become popular in various fields. In order to reduce the transmission loss for use in high frequency regions, a laminate of a dielectric layer containing a fluoropolymer and a copper foil is used. In such applications, the aqueous coating material composition of the present disclosure can be particularly suitably used.

EXAMPLES

The present disclosure is described with reference to Examples as follows. In Examples, % and parts as units used for the blending ratio mean mass % and parts by mass, respectively, unless otherwise specified. The present disclosure is not limited to Examples described below.

Example 1

Step 1: Preliminary Crushing (Dry Crushing)

A tetrafluoroethylene (TFE)/perfluorovinyl ether (PFVE) copolymer (PFA: melting point=300° C., MFR=25 g/10 min) was produced by suspension polymerization, and the resulting dry powder was directly crushed with an air jet mill (manufactured by I.M. Material Corporation) to make a fine powder having an average particle size of 10 μm.

Step 2: Preliminary Mixing (Preliminary Dispersion)

With 10 parts by mass of acetylene glycol dispersant (Surfynol 440, manufactured by Air Products and Chemicals, Inc.), 10 parts by mass of silicone surfactant (KP-106, manufactured by Shin-Etsu Chemical Co., Ltd.) and 280 parts by mass of ion-exchanged water, 100 parts by mass of the PFA fine powder obtained in the step 1 were sufficiently stirred and mixed, so that a PFA dispersion was obtained.

Step 3: Wet Crushing

The PFA dispersion obtained in step 2 was filtered with a 100-mesh wire screen, and then passed through a high-pressure emulsifier (Nanomizer manufactured by Yoshida Kikai Industrial Co., Ltd., crushing pressure: 200 MPa) to obtain a dispersion of PFA fine powder having an average particle size of 0.20 μm (measured with CAPA700 manufactured by HORIBA, Ltd.)(fluororesin particles (A-1) dispersion).

The particle size at a cumulative volume of 50% of the resulting PFA fine powder was 0.20 μm.

Step 4: Making of Coating Material

To 100 parts by mass of the PFA fine powder dispersion obtained by step 3, 2.5 parts by mass of a silicone surfactant (KP-106, manufactured by Shin-Etsu Chemical Industry Co., Ltd.) and a 10 wt % aqueous solution of polyvinyl alcohol (PVA manufactured by Fuji Film Wako Pure Chemical Industries, Ltd.) as binder resin were added so as to have a PVA content of 2.7 parts by mass. Further, to the mixture, 20 parts by mass of ion exchanged water was added to make a coating material.

The weight loss of the polyvinyl alcohol at 400° C. was 75.6%. The solubility in water was 10 mass % or more.

Examples 2 to 6

Making of coating material was performed in the same manner as in Example 1, except that each blending component was changed as shown in Table 1.

Example 7

Making of coating material was performed in the same manner as in Example 1, except that a PFA fine powder having an average particle size of 25.0 μm was used and wet crushing was omitted (fluororesin particles (A-2) dispersion).

The particle size at a cumulative volume of 50% of the resulting PFA fine powder was 22.9 μm.

Examples 8 to 12

Making of coating material was performed in the same manner as in Example 1, except that each blending component was changed as shown in Table 1.

Examples 13 to 30 and Comparative Examples 1 to 6

Making of coating material was performed in the same manner as in Example 1, except that each blending component was changed as shown in Tables 2, 3 and 4. In the case of blending silica, the blending amount was the same as the mass of the fluororesin.

A dispersion of FEP fine powder having an average particle size of 0.2 μm (measured by CAPA700 manufactured by HORIBA, Ltd.) (fluororesin particles (A-3) dispersion) was obtained in the same manner as with the dispersion of PFA fine powder (fluororesin particles (A-1) dispersion) described above, except that a tetrafluoroethylene [TFE]/hexafluoropropylene [HFP] copolymer (FEP) was produced by suspension polymerization.

The particle size at a cumulative volume of 50% of the resulting FEP fine powder was 0.23 μm.

Examples 31 to 33

Making of coating material was performed in the same manner as in Example 1, except that each blending component was changed as shown in Table 3. In the case of blending silica, the blending amount was the same as the mass of the fluororesin.

The components that were used are shown in the following.

MC400: Methylcellulose 400, manufactured by Fuji Film Wako Pure Chemical Industries, Ltd.

The weight loss at 400° C. was 87.3%. The solubility in water was 2 mass %.

GM14L: Gohsenol™, manufactured by Mitsubishi Chemical Corporation

The weight loss at 400° C. was 77.7%. The solubility in water was 10 mass % or more.

Polyacrylic acid: Polyacrylic acid 250,000

The weight loss at 400° C. was 53.1%. The solubility in water was 10 mass % or more.

Silica: Admafine SC2500-SQ manufactured by Admatechs, average particle size: 0.5 μm, specific surface area: 6.1 $m^2/g$, maximum particle size: 1.7 μm The resulting coating material composition was evaluated based on the following criteria.

A resin coating layer was obtained according to the following method.

A coating material was applied onto a copper foil (CF-V9S-SV-18 manufactured by Fukuda Metal Foil and Powder Co., Ltd.) with a bar coater (No. 40). The coated copper foil was dried at 130° C. for 15 minutes to evaluate powder falling. Further, sintering was performed at 350° C. for 15 minutes under a nitrogen gas atmosphere to obtain a coating film. The coating had a thickness of 30±5 μm. No ethylene glycol remained in the coating film after sintering.

(Powder Falling)

When rubbed with a finger and when pressed with a finger, the falling out of fluororesin powder was visually checked.

Poor: Falling out of powder was observed.

Fair: Adhesion of powder to a finger was observed.

Good: No adhesion of powder to a finger was observed.

(Unevenness)

In order to evaluate the surface roughness, presence or absence of unevenness was visually checked.

Poor: The unevenness was present.

Good: The unevenness was absent.

(Coloring)

The presence or absence of coloring of the coating layer was visually checked.

Poor: Coloring is present.

Fair: Slight coloring is present.

Good: Coloring is absent (transparent or in white color).

(Warpage of Copper-Clad Laminate)

The presence or absence of warpage of the resulting copper-clad laminate was visually checked.

Poor: Floating was observed.

Good: No floating was observed.

| | | Example 1<br>A-1 | Example 2<br>A-1 | Example 3<br>A-1 | Example 4<br>A-1 | Example 5<br>A-1 | Example 6<br>A-1 |
|---|---|---|---|---|---|---|---|
| Silica | | Absent | Absent | Absent | Absent | Absent | Absent |
| Binder | Type | PVA | PVA | PVA | PVA | PVA | PVA |
| | Concentration | 10 | 5 | 2 | 1 | 0.5 | 0.3 |
| Powder | Rubbed | Good | Good | Good | Good | Good | Good |
| falling | Pressed with finger | Good | Good | Good | Good | Good | Fair |
| Unevenness | | Good | Good | Good | Good | Good | Goode |
| Coloring after sintering | | Fair | Good | Good | Good | Good | Good |
| Warpage of copper-clad laminate | | Poor | Poor | Poor | Poor | Poor | Poor |

| | | Example 7<br>A-2 | Example 8<br>A-2 | Example 9<br>A-2 | Example 10<br>A-2 | Example 11<br>A-2 | Example 12<br>A-2 |
|---|---|---|---|---|---|---|---|
| Silica | | Absent | Absent | Absent | Absent | Absent | Absent |
| Binder | Type | PVA | PVA | .PVA | PVA | PVA | PVA |
| | Concentration | 10 | 5 | 2 | 1 | 0.5 | 0.3 |
| Powder | Rubbed | Good | Good | Good | Goode | Good | Good |
| falling | Pressed with finger | Good | Good | Good | Good | Good | Fair |
| Unevenness | | Good | Good | Good | Good. | Good | Good |
| Coloring after sintering | | Fair | Good | Good | Good | Good | Good |
| Warpage of copper-clad laminate | | Poor | Poor | Poor | Poor | Poor | Poor |

| | | Example 13<br>A-1 | Example 14<br>A-1 | Example 15<br>A-1 | Example 16<br>A-1 | Example 17<br>A-1 | Example 18<br>A-1 |
|---|---|---|---|---|---|---|---|
| Silica | | Present | Present | Present | Present | Present | Present |
| Binder | Type | PVA | PVA | PVA | PVA | PVA | PVA |
| | Concentration | 10 | 5 | 2 | 1 | 0.5 | 0.3 |
| Powder | Rubbed | Good | Good | Good | Good | Good | Good |
| falling | Pressed with finger | Good | Good | Good | Good | Fair | Fair |
| Unevenness | | Good | Good | Good | Good | Good | Fair |
| Coloring after sintering | | Fair | Good | Good | Good | Good | Good |
| Warpage of copper-clad laminate | | Good | Good | Good | Good | Good | Good |

| | | Example 19<br>A-2 | Example 20<br>A-2 | Example 21<br>A-2 | Example 22<br>A-2 | Example 23<br>A-2 | Example 24<br>A-2 |
|---|---|---|---|---|---|---|---|
| Silica | | Present | Present | Present | Present | Present | Present |
| Binder | Type | PVA | PVA | PVA | PVA | PVA | PVA |
| | Concentration | 10 | 5 | 2 | 1 | 0.5 | 0.3 |
| Powder | Rubbed | Good | Good | Good | Good | Good | Good |
| falling | Pressed with finger | Good | Good | Good | Good | Fair | Fair |
| Unevenness | | Good | Good | Good | Good | Good | Fair |
| Coloring after sintering | | Fair | Good | Good | Good | Good | Good |
| Warpage of copper-clad laminate | | Good | Good | Good | Good | Good | Good |

| | | Example 25 A-2 | Example 26 A-2 | Example 27 A-2 | Example 28 A-2 | Example 29 A-2 |
|---|---|---|---|---|---|---|
| Silica | | Present | Present | Present | Present | Presente |
| Binder | Type | MC400 | MC400 | MC400 | GM14L | GM14L |
| | Concentration | 1 | 0.50 | 0.3 | 1 | 0.5 |
| Powder falling | Rubbed | Good | Good | Good | Good | Good |
| | Pressed with finger | Good | Fair | Fair | Good | Good |
| Unevenness | | Good | Good | Good | Good | Good |
| Coloring after sintering | | Good | Good | Good | Good | Good |
| Warpage of copper-clad laminate | | Good | Good | Good | Good | Good |

| | | Example 30 A-2 | Example 31 A-3 | Example 32 A-3 | Example 33 A-3 |
|---|---|---|---|---|---|
| Silica | | Present | Present | Present | Present |
| Binder | Type | GM14L | PVA | PVA | PVA |
| | Concentration | 0.3 | 1 | 0.5 | 0.3 |
| Powder falling | Rubbed | Good | Good | Good | Good |
| | Pressed with finger | Good | Good | Fair | Fair |
| Unevenness | | Good | Good | Good | Fair |
| Coloring after sintering | | Good | Good | Good | Good |
| Warpage of copper-clad laminate | | Good | Good | Good | Good |

TABLE 4

| | | Comparative Example 1 A-1 | Comparative Example 2 A-1 | Comparative Example 3 A-1 | Comparative Example 4 A-1 | Comparative Example 5 A-2 | Comparative Example 6 A-2 |
|---|---|---|---|---|---|---|---|
| Silica | | Absent | Present | Absent | Present | Absent | Present |
| Binder | Type | Not blended | Not blended | Polyacrylic acid | Polyacrylic acid | PVA | PVA |
| | Concentration | 0 | 0 | 3 | 3 | 15 | 15 |
| Powder falling | Rubbed | Poor | Poor | Good | Good | Good | Good |
| | Pressed with finger | Poor | Poor | Good | Good | Good | Good |
| Unevenness | | Poor | Poor | Good | Good | Good | Good |
| Coloring after sintering | | Good | Good | Poor | Poor | Poor | Poor |
| Warpage of copper-clad laminate | | Poor | Good | Poor | Good | Poor | Good |

From the results in Tables 1 to 4, it has been shown that from the aqueous coating material composition of the present disclosure, a favorable fluororesin coating layer capable of suppressing powder falling can be formed without occurrence of unevenness or coloring.

Incidentally, in Examples without blending with silica, although the evaluation on the warpage of a copper-clad laminate is poor, the evaluation of the performance on powder falling, unevenness and coloring after sintering is preferable. Accordingly, the aqueous coating material composition without blending with silica may be preferably used in a field where suppression of the warpage is not particularly important. On the other hand, blending silica is preferred in terms of further improvement in suppression of warpage of a copper-clad laminate.

INDUSTRIAL APPLICABILITY

According to the present disclosure, an aqueous coating material composition is obtained, from which a coating layer excellent in electrical properties and surface physical properties can be formed with suppression of powder falling. The aqueous coating material composition is suitably used for coating of a printed circuit board, a dielectric material for a circuit board, a laminated circuit board, etc.

What is claimed is:

1. An aqueous coating material composition comprising:

fluororesin particles (A) that can be melt-molded, a binder resin (B), a non-fluorinated surfactant (C), and water (D), wherein the aqueous coating material composition is free of fluorinated surfactants;

wherein the binder resin (B) is present in an amount of not more than 10 mass %, relative to total solid content of the aqueous coating material composition;

wherein the binder resin (B) remains in the coating material composition after dehydration by heating at room temperature to 130° C.; and wherein the binder resin (B) has a partial weight loss of at least 55% at 400° C., measured with TG/DTA under conditions at 10° C./min under $N_2$.

2. The aqueous coating material composition according to claim 1, wherein the fluororesin particles (A) have an average particle size of 0.05 to 1,000 μm.

3. The aqueous coating material composition according to claim 1, wherein the fluororesin particles (A) have a particle size at a cumulative volume of 50% of 0.05 to 40 μm.

4. The aqueous coating material composition according to claim 1, wherein the binder resin (B) has a solubility in water of 2 mass % or more.

5. The aqueous coating material composition according to claim 1, wherein the non-fluorinated surfactant (C) is a silicone surfactant.

6. The aqueous coating material composition according to claim 1, further comprising a glycol solvent (E).

7. The aqueous coating material composition according to claim 6, wherein the glycol solvent (E) is capable being removed from the aqueous coating material by drying and subsequent sintering.

8. The aqueous coating material composition according to claim 1, further comprising an inorganic filler (F).

9. The aqueous coating material composition according to claim 8, wherein the inorganic filler (F) is silica.

10. The aqueous coating material composition according to claim 8, wherein the inorganic filler (F) has an average particle size of 0.1 to 20 μm.

11. The aqueous coating material composition according to claim 8, wherein the inorganic filler (F) has a maximum particle size of 10 μm or less.

12. The aqueous coating material composition according to claim 8, wherein the inorganic filler (F) is surface-treated with at least one silicon compound.

13. The aqueous coating material composition according to claim 12, wherein the at least one silicon compound is selected from the group consisting of silane coupling agents and organosilazanes.

14. The aqueous coating material composition according to claim 8, wherein the inorganic filler (F) is an inorganic filler that can be uniformly dispersed when 70% by mass of the inorganic filler and 30% by mass of water are mixed.

15. A coated article formed by: applying the aqueous coating material composition according to claim 1 on a substrate; drying the aqueous coating material composition to remove the water by heating at room temperature to 130° C.; and sintering the dried coating material composition.

16. The coated article according to claim 15, wherein the substrate is a metal substrate.

17. The coated article according to claim 15, wherein the coated article is a printed circuit board, a dielectric material for a circuit board, or a laminated circuit board.

* * * * *